Figure 1:
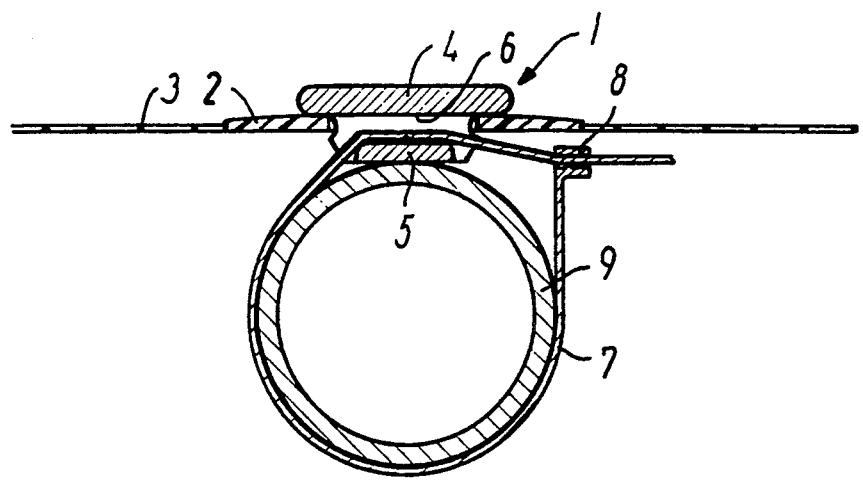

United States Patent [19]

Solbeck

[11] Patent Number: 5,388,311
[45] Date of Patent: Feb. 14, 1995

[54] FASTENING AND LOCKING DEVICE FOR TARPAULINS AND SIMILAR COVERING MATERIALS

[75] Inventor: Peter Sølbeck, Rungsted Kyst, Denmark

[73] Assignee: Polysheet A/S, Herlev, Denmark

[21] Appl. No.: 88,537

[22] Filed: Jul. 9, 1993

[30] Foreign Application Priority Data

Jul. 20, 1992 [DK] Denmark .............................. 0933/92

[51] Int. Cl.[6] ........................ B65D 63/00; F16B 21/00
[52] U.S. Cl. ..................................... 24/16 R; 24/453; 16/2
[58] Field of Search ............. 24/16 R, 3 M, 25, 713.6, 24/704.1, 662, 461, 453; 135/89; 16/2; 411/339, 44, 49

[56] References Cited

U.S. PATENT DOCUMENTS

| | | | |
|---|---|---|---|
| 2,062,057 | 11/1936 | Hobby | 24/453 |
| 3,092,175 | 6/1963 | Suessle | 24/453 |
| 3,106,759 | 10/1963 | Kytta | 24/453 |
| 3,210,820 | 10/1965 | Humiston | 24/704.1 |
| 3,213,567 | 10/1965 | Christian et al. | 24/662 |
| 4,470,737 | 9/1984 | Wollar | 24/453 |
| 5,103,538 | 4/1992 | Ryder | 24/662 |
| 5,222,988 | 6/1993 | Riley | 16/2 |

*Primary Examiner*—Victor N. Sakran
*Attorney, Agent, or Firm*—Beveridge, DeGrandi, Weilacher & Young

[57] ABSTRACT

A fastening and locking device for tarpaulins and similar weather protective covering materials includes a pluglike member to be mounted in an eyelet (2) with a head (4) in abutment against one side of the tarpaulin (3) and in connection therewith a shank portion (5) projecting through the eyelet opening towards the opposite side of the tarpaulin, the shank portion having a smaller diameter than the head (4), in which a transverse channel (6) is provided for receiving an anchoring or locking member (7).

20 Claims, 1 Drawing Sheet

U.S. Patent     Feb. 14, 1995     5,388,311

FASTENING AND LOCKING DEVICE FOR TARPAULINS AND SIMILAR COVERING MATERIALS

The invention relates to a fastening and locking device for tarpaulins and similar weather protective covering materials of the type which for fastening purposes is provided with inserted eyelets.

For fastening tarpaulins to scaffoldings and similar supporting structures it is well known to make use of flexible straps in connction with an anchoring pin which after being passed through a tarpaulin eyelet operates as abutment against the external side of the eyelet while the strap with two free strap ends is passed through the eyelet to be connected with an element of the supporting structure.

Examples of such fastening devices are known, e.g. from DK-B-156,307 and the published International Patent Applications WO 88/04368 and WO 91/14842.

While the prior art straps primarily aim at allowing mounting from the internal side of large tarpaulin areas used for scaffolding covering, the object of the invention is to provide a new design of a fastening and locking device which besides being applicable for the same purpose as the known flexible straps is particularly fit for securing tarpaulins and similar covering materials to supporting structures for tents, lightweight storing halls for machines, implements and materials and similarly provisional or semi-permanent buildings, and it is likewise aimed at providing a design well fit for edge joining of two tarpaulins with or without simultaneous securing to a supporting structure.

To accomplish this, the fastening and locking device according to the invention is characterized in that it comprises a pluglike member to be mounted in an eyelet with a head in abutment against one side of the tarpaulin and in connection therewith a shank portion projecting through the eyelet opening towards the opposite side of the tarpaulin, the shank portion having a diameter smaller than the head, a transverse channel being provided in the shank portion and an anchoring or locking member to be received in said transverse channel. The channel is closed in a direction which is longitudinal of the shank to prevent the anchoring or locking member from separating from the channel in this longitudinal direction.

Besides fulfilling the above purposes the device according to the invention entails the particularly important advantage when using tarpaulins as roof coverings in building structures of the type concerned that the tarpaulin is made waterproof, since the pluglike member seals the eyelets.

In use of fastening and locking devices according to the invention the pluglike members are mounted in the tarpaulin eyelets in the manner stated, the pluglike members being designed so as to be safely retained in the eyelets in which they are mounted. In this respect, a preferred embodiment is further characterized in that between the head and an elastic, resilient collar portion at its free end the shank portion has a constriction corresponding to the eyelet opening, and that the transverse channel extends at least partially through said constriction.

The anchoring or locking member the more specific design of which may vary in dependence on the purpose of use may either be disposed in the pluglike member prior to its being mounted, or it may be arranged in the transverse channel after the pluglike member has been mounted.

To ensure that an anchoring member disposed in the pluglike member prior to mounting thereof is retainable to the pluglike member in that an internally protruding flexible locking flap is provided in the transverse channel and that the anchoring or locking member has a toothed section for engagement with said locking flap. To provide the anchoring member with such a toothing is for instance known from the above referenced International Patent Application WO 91/14842.

In order to allow the anchoring member to penetrate through the tarpaulin eyelet concurrently with mounting the pluglike member it is further advantageous that the anchoring member is formed as a flexible strap and that the shank portion in connection with the transverse channel is formed with opposite, inwardly directed recesses for receiving parts of the flexible strap positioned outside the transvese channel.

For use in the edge joining of two tarpaulins the anchoring member may have the shape as a locking pin which may optionally be formed integrally with the shank portion of the pluglike member.

Figure 2:
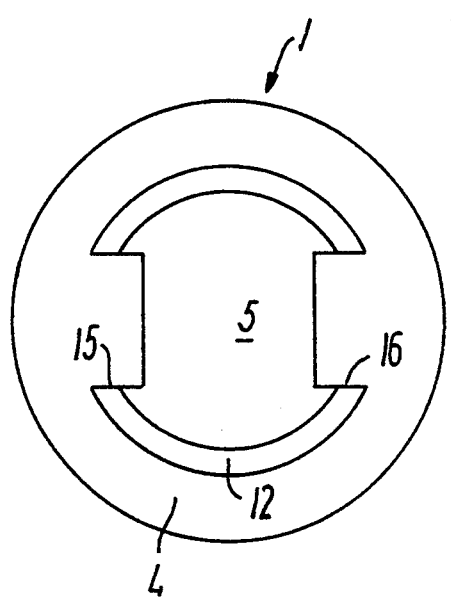
Figure 3:
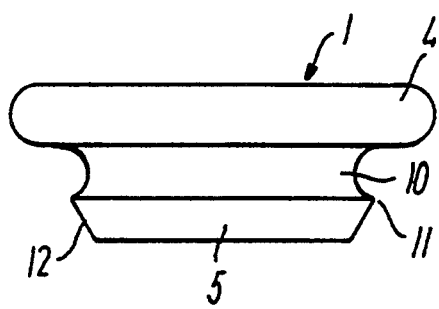
Figure 4:
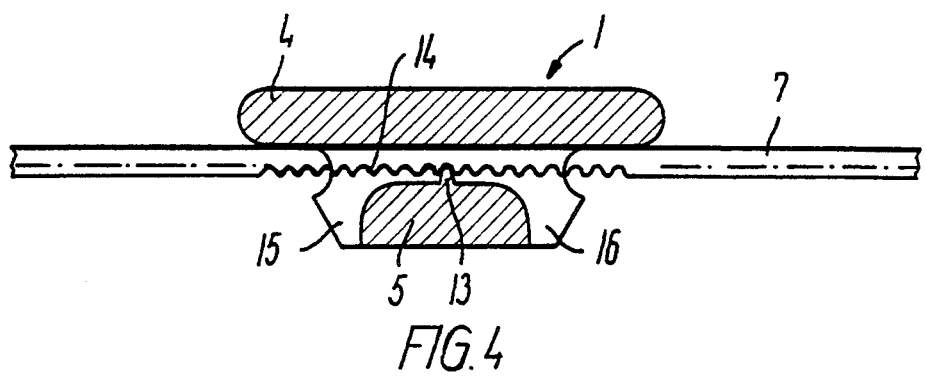

The invention will now be explained in detail with reference to the drawings, in which FIG. 1 is a cross-sectional view of an embodiment of a fastening and locking device according to the invention, used for securing a tarpaulin to a tubular supporting member, and FIGS. 2, 3 and 4 show a preferred embodiment of a pluglike member of the device, viewed from the front, from the side and in a cross-sectional view, respectively.

As appears from FIG. 1, the fastening and locking device according to the invention includes a pluglike member 1, designed to be mounted in an eyelet 2 in a tarpaulin 3, the member 1 being provided with a head 4 in abutment against one side of the tarpaulin 3 and the eyelet 2 and a shank portion 5 formed integrally with the head 4 and projecting through the opening in the eyelet 2 towards the opposite side of the tarpaulin 3.

The shank portion 5 has a smaller diameter than the head 4 but is designed to be retained in the opening of the eyelet 2 so that once mounted the plug member 1 does not fall out.

In the shank portion 5 there is provided a transverse channel 6 for receiving an anchoring or locking member which in FIG. 1 is shown in the form of an elastic strap 7 at one end of which a locking member 8 is provided which may retain the opposite free end of the strap 7 once the latter has been passed through the locking member. The design of a tarpaulin strap with such a locking member is known per se from the above referenced International Patent Application WO 91/14842. The plug member 1 and thus also the tarpaulin is fastened by means of the strap 7 to a tubular member 9, as shown, which may form part of a larger supporting structure, e.g. a support for a tent or a similar provisional or semi-permanent building structure, for instance serving for weather protective storing of machines, implements, materials and the like. The tubular member 9 may, however, also be an element of an ordinary scaffolding structure.

In the preferred embodiment of the plug member 1 illustrated on a larger scale in FIGS. 2 to 4, a constriction 10 corresponding to the opening of the eyelet 2 is provided in the shank portion 5 between the head 4 and an elastic, resilient collar portion 11 at the free end of the shank portion 5, the transverse channel 6 extending at least partially through the constriction 10.

Since the plug member 1 may be made from an appropiate plastic material, e.g. nylon, the elastic resiliency of the collar portion 11 may for instance be obtained by giving the collar portion an oblique edge surface 12 with decreasing diameter in the direction away from the constriction 10.

With a view to retain the anchoring or the locking member 7 of which only a section is shown in FIG. 3, the transverse channel 6 is provided with an internally projecting flexible locking flap 13 designed to engage with a toothed portion 14 of the anchoring member 7.

In order to allow the mounting of an anchoring member in the form of a flexible strap, as shown in FIG. 1, within the plug member 1 prior to mounting of the latter in the tarpaulin eyelet 2 the shank portion 5 may in connection with the transverse channel 6, as appears most clearly from FIGS. 1 and 3, be provided with opposite, inwardly directed recesses 15 and 16 for receiving the parts of the flexible strap positioned outside the transverse channel 6.

Instead of having the form of a flexible strap the anchoring or locking member may also be performed as a comparatively rigid locking pin which may likewise be provided with a toothing for engagement with the locking lobe 13.

In order to avoid a design with two separate parts such a locking pin may for instance through a flexible transition member be integral with the shank portion 5.

I claim:

1. A fastening and locking device for tarpaulins and similar weather protective covering materials of the type which for fastening purposes is provided with inserted eyelets (2), characterized in that it comprises a pluglike member to be mounted in an eyelet (2) with a head (4) in abutment against one side of the tarpaulin (3) and in connection therewith a shank portion (5) projecting through the eyelet opening towards the opposite side of the tarpaulin, the shank portion having a smaller diameter than the head (4), a transverse channel (6) being provided in the shank portion and an anchoring or locking member (7) to be received in said transverse channel, said channel being closed in a direction which is longitudinal of the shank to prevent the anchoring or locking member from separating from said channel in said longitudinal direction.

2. A fastening and locking device according to claim 1, characterized in that between the head (4) and an elastic, resilient collar portion (11) at its free end the shank portion (5) has a constriction (10) corresponding to the eyelet opening, and that the transverse channel (6) extends at least partially through said constriction (10).

3. A fastening and locking device according to claim 2, characterized in that the collar portion (11) has an oblique edge surface (12) with decreasing diameter in the direction away from the constriction (10).

4. A fastening and locking device according to claim 1, characterized in that the anchoring member (7) is formed as a flexible strap and that the shank portion (5) in connection with the transverse channel (6) is formed with opposite, inwardly directed recesses (15,16) for receiving parts of the flexible strap positioned outside the transverse channel (6).

5. A fastening and locking device according to claim 4, characterized in that the anchoring member (7) formed as a flexible strap is at one end provided with a locking member (8).

6. A fastening and locking device according to claims 1, 2, or 3, characterized in that the anchoring member has the form of a locking pin.

7. A fastening and locking device according to claim 6, characterized in that the locking pin is formed integrally with the shank portion.

8. A fastening and locking device for tarpaulins and similar weather protective covering materials of the type which for fastening purposes is provided with inserted eyelets (2), characterized in that it comprises a pluglike member to be mounted in an eyelet (2) with a head (4) in abutment against one side of the tarpaulin (3) and in connection therewith a shank portion (5) projecting through the eyelet opening towards the opposite side of the tarpaulin, the shank portion having a smaller diameter than the head (4), a transverse channel (6) being provided in the shank portion and an anchoring or locking member (7) to be received in said transverse channel, an internally protruding flexible locking flap (13) located in the transverse channel (6), said anchoring or locking member (7) having a toothed section for engagement with said locking flap.

9. A fastening and locking device according to claim 8 wherein the shank portion has a free end provided with a resilient collar portion (11), said shank portion having between the head (4) and the collar portion (11) a constriction (10) corresponding to the eyelet opening, said transverse channel (6) extending at least partially through said constriction (10).

10. A fastening and locking device according to claim 9, characterized in that the collar portion (11) has an oblique edge surface (12) with decreasing diameter in the direction away from the constriction (10).

11. A fastening and locking device according to claim 8, characterized in that the anchoring member (7) is formed as a flexible strap and that the shank portion (5) in connection with the transverse channel (6) is formed with opposite, inwardly directed recesses (15, 16) for receiving parts of the flexible strap positioned outside the transverse channel (6).

12. A fastening and locking device according to claim 11, characterized in that the anchoring member (7) formed as a flexible strap is at one end provided with a locking member (8).

13. A fastening and locking device according to claim 8 characterized in that the anchoring member has the form of a locking pin.

14. A fastening and locking device according to claim 13, characterized in that the locking pin is formed integrally with the shank portion.

15. A fastening and locking device for tarpaulins and similar weather protective covering materials of the type which for fastening purposes is provided with inserted eyelets (2), characterized in that it comprises a pluglike member to be mounted in an eyelet (2) with a head (4) in abutment against one side of the tarpaulin (3) and in connection therewith a shank portion (5) projecting through the eyelet opening towards the opposite side of the tarpaulin, the shank portion having a smaller diameter than the head (4), a transverse channel (6) being provided in the shank portion and an anchoring or locking member (7) to be received in said transverse channel, said anchoring member (7) formed as a flexible strap, and said shank portion (5) in connection with the transverse channel (6) being formed with opposite, inwardly directed recesses (15, 16) for receiving parts of the flexible strap positioned outside the transverse channel (6).

16. A fastening and locking device according to claim 15, characterized in that the anchoring member (7) formed as a flexible strap is at one end provided with a locking member (8).

17. A fastening and locking device according to claim 16 wherein the shank portion has a free end provided with a resilient collar portion (11), said shank portion having between the head (4) and the collar portion (11) a constriction (10) corresponding to the eyelet opening, said transverse channel (6) extending at least partially through said constriction (10).

18. A fastening and locking device according to claim 15, characterized in that the collar portion (11) has an oblique edge surface (12) with decreasing diameter in the direction away from the constriction (10).

19. A fastening and locking device according to claim 15, characterized in that the anchoring member has the form of a locking pin.

20. A fastening and locking device according to claim 19, characterized in that the locking pin is formed integrally with the shank portion.

* * * * *